US012723121B2

(12) United States Patent
Chen et al.

(10) Patent No.: US 12,723,121 B2
(45) Date of Patent: Sep. 1, 2026

(54) PREPARATION METHODS OF SOLVENT-FREE SELF-EMULSIFYING WATER-SOLUBLE CHLORINATED POLYPROPYLENE

(71) Applicants: WUHAN HYPERBRANCHED POLYMERS SCIENCE & TECHNOLOGY CO., LTD., Wuhan (CN); HUBEI HYPERBRANCHED NEW MATERIALS SCIENCE & TECHNOLOGY CO., LTD., Xiaogan (CN)

(72) Inventors: Sufang Chen, Wuhan (CN); Sunmeng Huang, Wuhan (CN); Yangjie Luo, Wuhan (CN); Cheng Xu, Wuhan (CN)

(73) Assignees: WUHAN HYPERBRANCHED POLYMERS SCIENCE & TECHNOLOGY CO., LTD., Wuhan (CN); HUBEI HYPERBRANCHED NEW MATERIALS SCIENCE & TECHNOLOGY CO., LTD., Xiaogan (CN)

( * ) Notice: Subject to any disclaimer, the term of this patent is extended or adjusted under 35 U.S.C. 154(b) by 489 days.

(21) Appl. No.: 18/512,072

(22) Filed: Nov. 17, 2023

(65) Prior Publication Data

US 2024/0109995 A1 Apr. 4, 2024

Related U.S. Application Data

(63) Continuation of application No. PCT/CN2023/097327, filed on May 31, 2023.

(30) Foreign Application Priority Data

Sep. 30, 2022 (CN) ........................ 202211217095.3

(51) Int. Cl.
*C08F 220/14* (2006.01)
*C08F 255/02* (2006.01)

(52) U.S. Cl.
CPC ................................ *C08F 255/023* (2013.01)

(58) Field of Classification Search
CPC ................ C08F 255/023; C08F 220/14; C08F 220/1808; C08F 220/20
See application file for complete search history.

(56) References Cited

U.S. PATENT DOCUMENTS 5,510,453 A 4/1996 Kressdorf et al.

FOREIGN PATENT DOCUMENTS

| | | | | | |
|---|---|---|---|---|---|
| CN | 109400815 | A | | 3/2019 | |
| CN | 113088153 | A | * | 7/2021 | ........... C09D 175/14 |
| CN | 115505128 | A | | 12/2022 | |
| EP | 0539710 | A1 | | 5/1993 | |
| JP | H0841263 | A | | 2/1996 | |

OTHER PUBLICATIONS

Dong Xueru, et al., Acrylic modified chlorinated polypropylene emulsion, Chemical Industry and Engineering Progress, 2007, pp. 1449-1451, 1474, vol. 26, No. 10.
Qiu Xiaoting, Research Progress on Synthesis and Application of Hyperbranched Polyester, 2019, pp. 87-88, vol. 48, No. 15.
Rui Mu, et al., Research of arylic-terminated hyperbranched polyester modified styrene-acrylic emulsion, Applied Mechanics and Materials, 2013, pp. 380-384, vols. 395-396.
Luping Wang, et al., Synthesis of Recyclable Hyperbranched Polymers with High Efficiency of Promoting Degradation of Epoxy Resins, ChemistrySelect, 2018, pp. 4873-4883, vol. 3.
Zhang Dao-Hong, et al., Preparation of waterborne bisphenol-A epoxy resin emulsion, Adhesion, 2008, pp. 30-32, vol. 29, No. 2.

* cited by examiner

*Primary Examiner* — Jiangtian Xu
(74) *Attorney, Agent, or Firm* — Bayramoglu Law Offices LLC

(57) ABSTRACT

A preparation method of solvent-free self-emulsifying water-soluble chlorinated polypropylene is provided. By uniformly mixing chlorinated polypropylene, an acrylic acid/ester mixture and a cosolvent, initiating the chlorinated polypropylene to generate free radicals by using an initiator, further initiating free radical polymerization of the acrylic acid/ester mixture, then adding an isocyanate-terminal carboxyl hyperbranched polyester adduct, reacting, then neutralizing with amine, emulsifying, and diluting with deionized water, the solvent-free self-emulsifying water-soluble chlorinated polypropylene with a solid content of 30-45% may be obtained. The process of the present invention is simple, and easy to industrialize, and the product has the advantages of low VOC content, no organic solvent, water dilution, excellent stability, etc., and is expected to be widely used in the fields of water-soluble paints, surface modification of non-polar or low-polar plastics and the like.

8 Claims, No Drawings

PREPARATION METHODS OF SOLVENT-FREE SELF-EMULSIFYING WATER-SOLUBLE CHLORINATED POLYPROPYLENE

CROSS REFERENCE TO THE REPLATED APPLICATIONS

This application is a continuation application of International Application No. PCT/CN2023/097327, filed on May 31, 2023, which is based upon and claims priority to Chinese Patent Application No. 202211217095.3, filed on Sep. 30, 2022, the entire contents of which are incorporated herein by reference.

TECHNICAL FIELD

The present invention relates to the technical field of water-soluble chlorinated polypropylene, and specifically relates to a preparation method of solvent-free self-emulsifying water-soluble chlorinated polypropylene.

BACKGROUND

Due to "Double carbon" goal and the urgent requirements of environmental protection, replacing traditional solvent-based paints with water-soluble paints is an important direction of development in the field of paints. Among the existing water-soluble paints, water-soluble epoxy resins, water-soluble acrylic resins, water-soluble polyurethane resins, and water-soluble urea-formaldehyde resins and the like with high polarity occupy the main market, but their low adhesion on the surfaces of non-polar plastics such as polypropylene and polyethylene makes it difficult to use them for the primer coating of polypropylene car bumper bars. The automobile industry, as an important industry of China, has a large demand for surface coatings. At present, the primer of domestic automobile bumper bar surface coatings is mainly oil-based chlorinated polypropylene, with a solid content of only 8-10%, which generates a large amount of organic solvents volatilized in the process of spraying and manufacturing, severely polluting the environment and affecting human health. Therefore, there is an urgent need to develop water-soluble chlorinated polypropylene to replace solvent-type chlorinated polypropylene to solve this environmental pollution problem. Existing foreign water-soluble chlorinated polypropylene production technology is mainly achieved by coating chlorinated polypropylene with an emulsifier under high-speed stirring conditions; stirring speed of the emulsifying machine is higher than 1000 rpm; high speed, long time, high safety requirements for the reactor, small size of the reactor, low loading coefficient, small output of a single batch, small-scale industrialization, high cost, low solid content (≤30%), the imported products have high market price, it is difficult to promote the use at large-scale. There are some domestic technology reports on preparation of water-soluble chlorinated polypropylene using acrylic acid and acrylate grafting to modify chlorinated polypropylene, but in the preparation process one needs to add a large amount of organic solvents such as toluene, xylene, chloroform, ethyl acetate, butyl acetate, butanone and the like. Though the prepared product is water-soluble, the process of removing organic solvents is complex, and it is difficult to completely remove the organic solvents. The product containing organic solvents and additional emulsifiers has quality problems of poor stability, the drying process of which pollutes the environment and impacts the health of the personnel, and a certain degree of nonuniform film performance and the like. Therefore, developing the synthetic technology of water-soluble self-emulsifying chlorinated polypropylene without organic solvent, simple process, no volatilization, no pollution and low cost is the fundamental way to solve the current problems in this field.

SUMMARY

In order to solve the deficiencies in the prior art, the present invention provides a preparation method for solvent-free self-emulsifying water-soluble chlorinated polypropylene.

The present invention solves the above-described technical problem with following technical scheme:

A preparation method of a solvent-free self-emulsifying water-soluble chlorinated polypropylene, comprising a specific process as follows:

(1) mixing chlorinated polypropylene, a portion of an acrylic acid/ester mixture and a cosolvent, gradually raising temperature to about 80° C., and gradually dissolving the chlorinated polypropylene into a homogeneous solution under stirring conditions;

(2) gradually adding an initiator and the remaining acrylic acid/ester mixture to the solution of step (1) at 60-90° C., and after the addition is completed, and stirring for reaction at 70-140° C. for 0.5-2 hours;

(3) adding an isocyanate-terminated carboxyl hyperbranched polyester adduct to the solution of step (2) at 30-80° C., and stirring the reaction for 0.5-3 hours at the temperature;

(4) adding an amine neutralizer into the solution under a condition of 50-80° C. to neutralize the solution to a pH of 6.8-7.5, and then gradually adding deionized water, and emulsifying for 0.5-3 hours under a condition of 50-80° C. and 300-600 rpm, to obtain the solvent-free self-emulsifying water-soluble chlorinated polypropylene with a solid content of 30-45%;

the acrylic acid/ester mixture is a mixture of methyl methacrylate, octyl acrylate, and hydroxyalkyl acrylate;

the isocyanate-terminated carboxyl hyperbranched polyester adduct is a product of an addition reaction between equimolar terminated carboxyl hyperbranched polyester and diisocyanate.

Preferably, a mass ratio of the chlorinated polypropylene, the acrylic acid/ester mixture, the isocyanate-terminated carboxyl hyperbranched polyester adduct and the cosolvent is 100:(80-350):(0.5-5.0):(1.0-10.0), most preferably, 100:(120-300):(1.0-2.5):(2.0-5.0).

Preferably, a mass ratio of the methyl methacrylate, the octyl acrylate and the hydroxyalkyl acrylate is 1:(1.0-3.0):(0.1-1.0), most preferably 1:(1.2-2.0):(0.2-0.5).

Preferably, the hydroxyalkyl acrylate is one or more of hydroxyethyl acrylate (HEA), hydroxypropyl acrylate (HPA), hydroxyethyl methacrylate (HEMA), hydroxypropyl methacrylate (HPMA), 4-hydroxybutyl acrylate (HBA), and 2-hydroxybutyl methacrylate (HEMA).

Preferably, the isocyanate-terminated carboxyl hyperbranched polyester adducts contain an isocyanate group and a carboxyl group, and the specific reaction conditions and processes thereof are carried out with reference to the following literature: Luping Wang, Sufang Chen, et al. ChemistrySelect, 2018, 3:4873-4883.

Preferably, the terminated carboxyl hyperbranched polyester is one or more of HyPer C101, HyPer C102, HyPer C103, HyPer C104, HyPer C201, HyPer C202, HyPer C203, HyPer C204, HyPer C301, HyPer C302, HyPer C303, HyPer C304, HyPer C401, HyPer C402, HyPer C403, HyPer C404 from Wuhan Hyperbranched Resin Technology Co., Ltd, and the terminated carboxyl hyperbranched polyester has a number-averaged molecular weight of 950 to 13200 g/mol, an acid value of 110 to 360 mgKOH/g, and a hydroxyl value of ≤20 mgKOH/g. Their properties are shown in Table 1.

More preferably, the terminated carboxyl hyperbranched polyester is one or more of HyPer C102, HyPer C103, HyPer C202, HyPer C203, HyPer C302 and HyPer C402.

TABLE 1

Properties of terminated carboxyl hyperbranched polyesters

| Product Name | Hydroxyl value, mgKOH/g | Acid value, mgKOH/g | Number-averaged molecular weight, g/mol |
|---|---|---|---|
| HyPer C101 | ≤10 | 320 | 1000 |
| HyPer C102 | ≤10 | 240 | 2600 |
| HyPer C103 | ≤15 | 220 | 6400 |
| HyPer C104 | ≤15 | 210 | 12000 |
| HyPer C201 | ≤10 | 360 | 950 |
| HyPer C202 | ≤10 | 300 | 2100 |
| HyPer C203 | ≤15 | 260 | 5200 |
| HyPer C204 | ≤15 | 240 | 11000 |
| HyPer C301 | ≤15 | 340 | 950 |
| HyPer C302 | ≤15 | 260 | 2800 |
| HyPer C303 | ≤20 | 240 | 5700 |
| HyPer C304 | ≤20 | 230 | 9800 |
| HyPer C401 | ≤15 | 180 | 1200 |
| HyPer C402 | ≤15 | 130 | 3400 |
| HyPer C403 | ≤20 | 120 | 7600 |
| HyPer C404 | ≤20 | 110 | 13200 |

Preferably, the diisocyanate is one or more of toluene diisocyanate (TDI), methylene diphenyl diisocyanate (MDI), hexamethylene diisocyanate (HDI), isophorone diisocyanate (IPDI), dicyclohexylmethane diisocyanate (HMDI), lysine diisocyanate (LDI) and xylylene diisocyanate (XDI); more preferably, TDI, IPDI or LDI.

More preferably, the adducts of terminated carboxyl hyperbranched polyester and diisocyanate are named as C102-TDI, C102-IPDI, C103-IPDI, C203-LDI, and isocyanate-terminated carboxyl hyperbranched polyester adduct is one or more of the above adducts.

Preferably, the chlorinated polypropylene of the step (1) is one or more of the chlorinated polypropylenes with a chlorinate content of 23-41%; more preferably a product from Luzhou North Chemical Industries Co., Ltd., their properties being shown in Table 2.

TABLE 2

Properties of chlorinated polypropylene

| Product Name | Chlorinate content, % |
|---|---|
| K33 | 25 ± 2 |
| K11 | 30 ± 2 |
| CP-20 | 25 ± 2 |
| CP-30 | 39 ± 2 |
| CK-800 | 31 ± 2 |

Preferably, the cosolvent is one or more of propylene glycol methyl ether, propylene glycol ethyl ether, propylene glycol butyl ether, ethylene glycol methyl ether, ethylene glycol ethyl ether, ethylene glycol butyl ether and diethylene glycol dimethyl ether; more preferably, ethylene glycol butyl ether and/or diethylene glycol dimethyl ether.

Preferably, the initiator is one or more of dibenzoyl peroxide (BPO), azobisisobutyronitrile (AIBN), tert-butyl peroxy-2-ethyl hexanoate (TBPO), lauroyl peroxide (LPO), 1,1-bis(tert-amyl peroxy)cyclohexane, 1,1-bis(tert-amyl peroxy)-3,3,5-trimethylcyclohexane, dicumyl peroxide (DCP), tert-amyl peroxy acetate (TAPA) and tert-amyl peroxy benzoate (TAPB), more preferably, LPO, TAPA or TBPO; the dosage of the initiator is 0.1 wt % to 0.5 wt % of chlorinated polypropylene.

Preferably, the amine neutralizer is one or more of triethanolamine, diethanolamine, methyl diethanolamine, N,N-dimethylethanolamine, triethylamine and ammonium hydroxide.

The solvent-free self-emulsifying water-soluble chlorinated polypropylene prepared by the present invention has the following advantages over the products of the prior art:

(1) Octyl acrylate has better flexibility, which can improve the flexibility of the paint and contributes to the improvement of the binding ability of the surface coating and the underlying coating;

(2) Using isocyanate-terminated carboxyl hyperbranched polyester adducts grafted on the molecular chain of chlorinated polypropylene, the topology of the terminated carboxyl hyperbranched polyester ellipsoid and more surface carboxyls can effectively encapsulate and disperse chlorinated polypropylene, and after a large number of polar carboxyls on the surface are neutralized, an oil-in-water type of stable water-soluble chlorinated polypropylene is formed;

(3) The process effectively avoids the need to add organic solvents to dissolve chlorinated polypropylene in the prior art, which not only reduces VOC content and pollution of organic solvents, but also reduces cumbersome process of removing organic solvents, and reduces production cost;

(4) Commonly used emulsifiers do not participate in the curing reaction of the paints, resulting in poor adhesion, slow drying, and low solvent resistance of the coatings. The present invention utilizes the carboxyl self-emulsification of terminated carboxyl hyperbranched polyester, effectively avoiding the potential difficulties raised from the additional emulsifiers;

(5) The addition of cosolvents can effectively improve solubilization of chlorinated polypropylene, and leveling performance of the paint;

(6) The process is simple, with a low rotational speed for emulsification, which contributes to industrial applications.

DETAILED DESCRIPTION OF THE EMBODIMENTS

Specific embodiments of the present invention are further described below in connection with Examples. It is to be noted herein that the description of these embodiments is used to aid the understanding, rather than constituting a limitation of the present invention. Further the technical features involved in the various embodiments of the present invention described below may be combined with each other as long as they do not constitute a conflict with each other.

In all the Following Examples:

the terminated carboxyl hyperbranched polyesters used are all purchased from Wuhan Hyperbranched Resin Technology Co., Ltd, and the specific properties are described in Table 1 in Summary.

The chlorinated polypropylene used are the corresponding chlorinated polypropylene products purchased from Luzhou North Chemical Industries Co., Ltd, and the specific properties are described in Table 2 in Summary.

All other raw materials are commercially available products.

Isocyanate-terminated carboxyl hyperbranched polyester adducts are prepared with reference to the reaction conditions and process of in the Reference (Luping Wang, Sufang Chen, et al. ChemistrySelect, 2018, 3:4873-4883), utilizing an addition reaction between hydroxyl groups of 1 mol terminated carboxyl hyperbranched polyester and isocyanate groups of 1 mol diisocyanate, which would yield an adduct containing 1 mole isocyanate group and multiple moles of carboxyl group. Typically, utilizing HyPer C102, HyPer C103 and HyPer C302 and TDI, IPDI and LDI in an equimolar addition reaction, respectively, produces adducts which are named C102-TDI, C102-IPDI, C103-IPDI, C203-LDI, and the like, based on their abbreviations.

Example 1

50.0 g methyl methacrylate, 60.0 g octyl acrylate, and 10.0 g hydroxypropyl methacrylate (HPMA) were weighed in a beaker to obtain 120 g acrylic acid/ester mixture; a portion of the acrylic acid/ester mixture (about 50 g), 100 g chlorinated polypropylene K33 and 2.0 g ethylene glycol butyl ether were added to a triple neck flask with stirrer and condenser, and temperature was gradually increased to about 80° C. until the system became a homogeneous solution. At about 60° C., 0.1 g initiator LPO and the remaining acrylic acid/ester mixture were added gradually, after the addition was completed, stirred for reaction at 70° C. for 2.0 hours; temperature was lowered to about 30° C., to which 1.0 g C102-TDI was added, the reaction was stirred at 30° C. for another 3 hours; the reaction was warmed up to about 50° C., to which triethanolamine was slowly added to neutralized pH to about 6.8; at about 50° C. and stirring rate of 300 rpm, 227 g deionized water was added, and after addition, the reaction was continued to self-emulsify at 50° C. and 300 rpm for 3.0 hours to obtain solvent-free self-emulsifying water-soluble chlorinated polypropylene with a solid content of about 40%.

Example 2

90.0 g methyl methacrylate, 180.0 g octyl acrylate and 30.0 g 2-hydroxybutyl methacrylate (HBMA) were weighed in a beaker to obtain 300 g acrylic acid/ester mixture; a portion of the acrylic acid/ester mixture (about 150 g), 100 g chlorinated polypropylene CK-800 and 3.0 g diethylene glycol dimethyl ether were added to a triple neck flask with stirrer and condenser, and temperature was gradually increased to about 80° C. until the system became a homogeneous solution. Temperature was further raised to about 90° C., 0.5 g initiator TBPO and the remaining acrylic acid/ester mixture were added gradually, after the addition was completed, stirred for reaction at 90° C. for 1.0 hours; at about 50° C., 2.0 g C102-IPDI was added, the reaction was stirred for another 2.0 hours; at about 60° C., methyl diethanolamine was slowly added to neutralize pH to about 7.0; at about 60° C. and stirring rate of 500 rpm, 484 g deionized water was added gradually, and after addition, the reaction was continued to self-emulsify at 60° C. and 500 rpm for 1.0 hour to obtain solvent-free self-emulsifying water-soluble chlorinated polypropylene with a solid content of about 45%.

Example 3

70.0 g methyl methacrylate, 95.0 g octyl acrylate, and 35.0 g hydroxyethyl methacrylate (HEMA) were weighed in a beaker to obtain 200 g acrylic acid/ester mixture; a portion of the acrylic acid/ester mixture (about 150 g), 100 g chlorinated polypropylene K11, 2.0 g diethylene glycol dimethyl ether and 3.0 g ethylene glycol butyl ether were added to a triple neck flask with stirrer and condenser, and temperature was gradually increased to about 80° C. until the system became a homogeneous solution. At about 70° C., 0.3 g initiator BPO and the remaining acrylic acid/ester mixture were added gradually, and after the addition was completed, stirred for reaction at 80° C. for 0.5 h; at about 80° C., 1.5 g C103-IPDI was added, and the reaction was stirred for another 0.5 h; at about 80° C., N,N-dimethylethanolamine was slowly added to neutralize the pH to about 7.5; at about 80° C. and stirring rate of 600 rpm, 690 g deionized water was added gradually, and after addition, the reaction was continued to self-emulsify at 80° C. and 600 rpm for 0.5 hours to obtain a solvent-free self-emulsifying water-soluble chlorinated polypropylene with a solid content of about 30%.

Example 4

100.0 g methyl methacrylate, 125.0 g octyl acrylate and 25.0 g hydroxyethyl acrylate (HEA) were weighed in a beaker to obtain 250 g acrylic acid/ester mixture; a portion of the acrylic acid/ester mixture (about 100 g), 100 g chlorinated polypropylene CP-20, 3.5 g ethylene glycol ethyl ether and 0.5 g ethylene glycol butyl ether were added to a triple neck flask with stirrer and condenser, and temperature was gradually increased to about 60° C. until the system became a homogeneous solution. At about 70° C., 0.3 g initiator TAPA and the remaining acrylic acid/ester mixture were added gradually, and after addition was completed, stirred for reaction at 140° C. for 1.0 hour; temperature was lowered to about 60° C., and 1.5 g C203-LDI was added, and the reaction was stirred for another 1.0 hour; at about 60° C., N,N-dimethylethanolamine was slowly added to neutralize the pH to about 7.2; at about 60° C. and stirring rate of 400 rpm, 500 g deionized water was gradually added, and after addition, the reaction was continued to self-emulsify at 60° C. and 400 rpm for 1.5 hours to obtain a solvent-free self-emulsifying water-soluble chlorinated polypropylene with a solid content of about 40%.

Example 5

70.0 g methyl methacrylate, 95.0 g octyl acrylate and 35.0 g hydroxyethyl methacrylate (HEMA) were weighed in a beaker to obtain 200 g acrylic acid/ester mixture; a portion of the acrylic acid/ester mixture (about 150 g), 100 g chlorinated polypropylene CP-30 and 3.0 g diethylene glycol dimethyl ether were added to a triple neck flask with stirrer and condenser, and temperature was gradually increased to about 80° C. until the system became a homogeneous solution. At about 70° C., 0.3 g initiator LPO and the remaining acrylic acid/ester mixture were added gradually, and after the addition was completed, stirred for reaction at 70° C. for 1.5 h; at about 40° C., 2.0 g C103-IPDI was added, and the reaction was stirred for another 2.5 h; at about 60° C., diethanolamine was added slowly to neutralize the pH to about 7.0; at about 60° C. and stirring rate of 400 rpm, 445 g deionized water was added gradually, and after addition, the reaction was continued to self-emulsify at 60° C. and 400 rpm for 1.5 hours, to obtain a solvent-free self-emulsifying water-soluble chlorinated polypropylene with a solid content of about 40%.

Example 6

70.0 g methyl methacrylate, 95.0 g octyl acrylate, and 35.0 g hydroxyethyl methacrylate (HEMA) were weighed in a beaker to obtain 200 g acrylic acid/ester mixture; a portion of the acrylic acid/ester mixture (about 150 g), 50 g chlorinated polypropylene CP-20, 50 g chlorinated polypropylene CP-30, 2.0 g propylene glycol ether and 1.5 g ethylene glycol ethyl ether were added to a triple neck flask with stirrer and condenser, and the temperature was gradually increased to about 80° C. until the system became a homogeneous solution. At about 70° C., 0.1 g TAPA, 0.1 g TAPB, 0.1 g 1,1-bis(tert-amylperoxy)-3,3,5-trimethylcyclohexane and the remaining acrylic acid/ester mixture were added gradually, after the addition was completed, stirred for reaction at 130° C. for 1.5 hours; at about 50° C., 1.0 g C103-IPDI and 1.5 g C203-LDI were added and reaction was stirred for another 1.5 hours; at about 60° C., ammonium hydroxide was added slowly to neutralize the pH to about 7.0; at about 60° C. and stirring rate of 450 rpm, 550 g deionized water was added gradually, and after addition, continued to self-emulsify at 60° C. and 450 rpm for 1.5 hours to obtain a solvent-free self-emulsifying water-soluble chlorinated polypropylene with a solid content of about 35%.

The particle size of solvent-free self-emulsifying water-soluble chlorinated polypropylene was tested by a Malvern particle size analyzer, and its centrifugal stability grade was tested with reference to Daohong Zhang, Jiliang Zhou, Na Liu. Preparation of water-soluble bisphenol A-type epoxy resin emulsion, Adhesion, 2008,2,30", and the volatile organic content (VOC) was determined by gas chromatography. Properties of the products prepared in Examples 1-Example 6 are shown in Table 3.

TABLE 3

Properties of solvent-free water-soluble chlorinated polypropylene

| Example | Particle size, nm | Stability, grade | VOC content, % |
|---|---|---|---|
| Example 1 | 520 | 6 | 1.5 |
| Example 2 | 500 | 6 | 2.1 |
| Example 3 | 550 | 6 | 1.9 |
| Example 4 | 570 | 6 | 2.2 |
| Example 5 | 540 | 6 | 1.7 |
| Example 6 | 590 | 6 | 1.4 |

The prepared solvent-free self-emulsifying water-soluble chlorinated polypropylene has excellent stability, low VOC content, and meets the requirements for green coatings.

What is claimed is:

1. A preparation method of a solvent-free self-emulsifying water-soluble chlorinated polypropylene, comprising the following steps:

(1) mixing chlorinated polypropylene, a first portion of an acrylic acid/ester mixture, and a cosolvent to obtain a resulting mixture, raising temperature to 80±5° C., and gradually dissolving the resulting mixture into a homogeneous solution under stirring conditions;

(2) gradually adding an initiator and a second portion of the acrylic acid/ester mixture to the homogeneous solution of step (1) at 60-90° C. to obtain a first mixed solution, and after an addition is completed, stirring the first mixed solution for a first reaction at 70-140° C. for 0.5-2 hours to obtain a first reaction solution;

(3) adding an isocyanate-terminated carboxyl hyperbranched polyester adduct to the first reaction solution of step (2) at 30-80° C. to obtain a second mixed solution, and stirring the second mixed solution for a second reaction for 0.5-3 hours at 30-80° C. to obtain a second reaction solution;

(4) adding an amine neutralizer into the second reaction solution under a condition of 50-80° C. to neutralize the second reaction solution to a pH of 6.8-7.5, and then gradually adding deionized water, and emulsifying for 0.5-3 hours under the condition of 50-80° C. and 300-600 rpm, to obtain the solvent-free self-emulsifying water-soluble chlorinated polypropylene with a solid content of 30-45%;

wherein the acrylic acid/ester mixture is a mixture of methyl methacrylate, octyl acrylate, and hydroxyalkyl acrylate;

the isocyanate-terminated carboxyl hyperbranched polyester adduct is a product of an addition reaction between equimolar terminated carboxyl hyperbranched polyester and diisocyanate;

a mass ratio of the chlorinated polypropylene, the acrylic acid/ester mixture, the isocyanate-terminated carboxyl hyperbranched polyester adduct, and the cosolvent is 100:(80-350):(0.5-5.0):(1.0-10.0).

2. The preparation method according to claim 1, wherein a mass ratio of the methyl methacrylate, the octyl acrylate, and the hydroxyalkyl acrylate is 1:(1.0-3.0):(0.1-1.0).

3. The preparation method according to claim 1, wherein the hydroxyalkyl acrylate is one or more of hydroxyethyl acrylate (HEA), hydroxypropyl acrylate (HPA), hydroxyethyl methacrylate (HEMA), hydroxypropyl methacrylate (HPMA), 4-hydroxybutyl acrylate (HBA), and 2-hydroxybutyl methacrylate (HBMA).

4. The preparation method according to claim 1, wherein the diisocyanate is one or more of toluene diisocyanate (TDI), methylene diphenyl diisocyanate (MDI), hexamethylene diisocyanate (HDI), isophorone diisocyanate (IPDI), dicyclohexylmethane diisocyanate (RMDI), lysine diisocyanate (LDI), and xylylene diisocyanate (XDI).

5. The preparation method according to claim 1, wherein the chlorinated polypropylene in step (1) is one or more of chlorinated polypropylene with a chlorine content of 23%-41%.

6. The preparation method according to claim 1, wherein the cosolvent is one or more of propylene glycol methyl ether, propylene glycol ethyl ether, propylene glycol butyl ether, ethylene glycol methyl ether, ethylene glycol ethyl ether, ethylene glycol butyl ether, and diethylene glycol dimethyl ether.

7. The preparation method according to claim 1, wherein the initiator is one or more of dibenzoyl peroxide (BPO), azobisisobutyronitrile (AIBN), tert-butyl peroxy-2-ethyl hexanoate (TBPO), lauroyl peroxide (LPO), 1,1-bis(tert-amylperoxy)cyclohexane, 1,1-bis(tert-amylperoxy)-3,3,5-trimethylcyclohexane, dicumyl peroxide (DCP), tert-amyl peroxy acetate (TAPA), and tert-amyl peroxy benzoate (TAPB), and a dosage of the initiator used is 0.1 wt % to 0.5 wt % of a dosage of the chlorinated polypropylene.

8. The preparation method according to claim 1, wherein the amine neutralizer is one or more of triethanolamine, diethanolamine, methyl diethanolamine, N,N-dimethylethanolamine, triethylamine, and ammonium hydroxide.

* * * * *